United States Patent [19]

Spors et al.

[11] Patent Number: 5,064,227

[45] Date of Patent: Nov. 12, 1991

[54] CONNECTOR FOR HOSES AND THE LIKE

[75] Inventors: Ralf Spors, Bruchköbel; Gerhard Wachter, Büdingen; Ralf Hohmann, Bruchköbel; Heinz Sauer, Ronneburg, all of Fed. Rep. of Germany

[73] Assignee: Rasmussen GmbH, Maintal, Fed. Rep. of Germany

[21] Appl. No.: 591,837

[22] Filed: Oct. 2, 1990

[30] Foreign Application Priority Data

Oct. 7, 1989 [DE] Fed. Rep. of Germany ....... 3933589

[51] Int. Cl.$^5$ .............................................. F16L 39/04
[52] U.S. Cl. .................................. 285/319; 285/239; 285/921
[58] Field of Search ............... 285/239, 319, 320, 921, 285/39

[56] References Cited

U.S. PATENT DOCUMENTS

| | | | |
|---|---|---|---|
| 4,541,658 | 9/1985 | Bartholomew | 285/319 |
| 4,601,497 | 7/1986 | Bartholomew | 285/319 |
| 4,793,637 | 12/1988 | Laipply et al. | 285/319 X |
| 4,948,176 | 8/1990 | Bartholomew | 285/921 X |
| 4,948,180 | 8/1990 | Usui et al. | 285/319 |
| 4,979,765 | 12/1990 | Bartholomew | 285/319 X |

FOREIGN PATENT DOCUMENTS

2530863 2/1976 Fed. Rep. of Germany .

*Primary Examiner*—Andrew V. Kundrat
*Assistant Examiner*—Heather Chun
*Attorney, Agent, or Firm*—Peter K. Kontler

[57] ABSTRACT

A quick-release connector for pairs of hoses or other conduits has a tubular male component the front portion of which is insertable into the front part of a tubular female component and carries one or more sealing elements which engage the internal surface of the front part. The front portion of the male component is surrounded by a ring-shaped radially deformable retaining member with a smooth conical external surface which diverges from the axis of the male component in a direction toward the rear portion. The front part of the female component has a chamber behind one or more detents with radial flanks for engagement with the maximum-diameter end of the retaining member when the latter is fully received in the chamber. An annular deforming member is mounted in two windows of the front part for axial movement between a retracted position and an extended position in which the deforming member deforms the retaining member so that the latter can bypass the detent or detents and permits extraction of the front portion of the male component from the female component. The detent or detents deform the retaining member during insertion into the chamber, and the retaining member thereupon expands to abut the flank or flanks of the detent or detents. The windows communicate with the chamber of the front part and can extend all the way to the front end face of the female component.

19 Claims, 5 Drawing Sheets

CONNECTOR FOR HOSES AND THE LIKE

BACKGROUND OF THE INVENTION

The invention relates to improvements in connectors or couplings for hoses and other types of conduits. More particularly, the invention relates to improvements in so-called quick-release connectors wherein a portion of a male coupling component which is connected to a first conduit can be rapidly inserted into and rapidly withdrawn from a part of a female coupling component which is connected to another conduit It is already known to provide the front part of a tubular female coupling component with an internal radial flank which faces away from the rear part of the female component and is located in the path of outward movement of a retaining member on the front portion of a male coupling component while the front portion extends into the front part of the female component. The outer diameter of the retaining member on the male component decreases in a direction away from the tip of the male component. The retaining member is resilient and can be deformed in the radial direction and toward the axis of the male component to permit extraction of front portion of the male component from the front part of the female component. One or more ring-shaped sealing elements are installed between the external surface of the front portion of the male component and the internal surface of the front part of the female component.

U.S. Pat. Nos. 4,541,658 and 4,601,497 to Bartholomew disclose swivelable quick connector assemblies wherein the retaining member is slotted to form several arms which can be pivoted by hand to disengage the arms from an internal flank of the front part of the female component. This enables the operator to extract the front portion of the male coupling component from the female component. Each arm has an external shoulder which normally engages the internal flank of the female component and is supposed to be disengaged from the flank in response to depression of the exposed end of the respective arm in a direction toward the axis of the male component. A drawback of the patented connector assembly is that the shoulder or shoulders of one or more arms are likely to be caught by the internal flank if the respective arm or arms are not adequately depressed so that the front portion of the male component cannot be extracted from the female component. Moreover, it is often necessary to exert a pronounced force in order to move the shoulders of the arms radially inwardly and beyond the internal flank of the front part of the female component. Still further, the exposed portions of the arms are relatively short so that the fingers of the hand which is supposed to maintain the arms in depressed positions preparatory to and during extraction of the male component are likely to slide off the arms.

Published German patent application No. 25 30 863 of Hammond discloses a quick-release connector wherein the front portion of the male component carries a retaining ring having a wedge-shaped cross-sectional outline. In order to permit extraction of the male component from the female component, it is necessary to first push the male component deeper into the female component whereby the retaining ring penetrates into and is deformed radially inwardly by an annular deforming member in the female component so that the retaining ring is located radially inwardly of an internal shoulder of the female component. The male component is then ready to be extracted from the female component. A drawback of the proposal of Hammond is that the two components are likely to be accidentally separated from each other as a result of unintentional penetration of the male component deeper into the female component.

OBJECTS OF THE INVENTION

An object of the invention is to provide a quick-release connector or coupling for hoses and/or other types of conduits wherein the male and female components can be separated from and reengaged with each other in a simple, time-saving and predictable manner.

Another object of the invention is to provide a novel and improved retaining member for use in the above outlined connector.

A further object of the invention is to provide a novel and improved disengaging device for use in the above outlined connector.

An additional object of the invention is to provide a novel and improved female coupling component for use in the above outlined connector.

Still another object of the invention is to provide the connector with a novel and improved male coupling component.

A further object of the invention is to provide a novel and improved method of disengaging the male and female components of a quick-release connector for flexible and/or rigid conduits.

An additional object of the invention is to provide a novel and improved combination of male coupling component and retaining member for use in the above outlined connector.

Another object of the invention is to provide a novel and improved combination of female component and disengaging member for use in the above outlined quick-release connector.

SUMMARY OF THE INVENTION

The invention resides in the provision of a so-called quick-release or quick connector for conduits of all kinds, e.g., to establish a leakproof path for the flow of a gaseous, hydraulic or other flowable medium between two flexible hoses, between a nipple and a hose, between a hose and a pipe, between a nipple and a pipe, between two nipples or between two pipes. The improved connector comprises an elongated tubular male component including a rear portion which is insertable into or is otherwise connectable to one end portion of a first conduit and a front portion, and an elongated tubular female component including a rear part which is insertable into or is otherwise connectable with a second conduit, and a front part which defines an internal chamber for the front portion of the male component. The front part of the female component has an axial inlet which communicates with the chamber and permits insertion or extraction of the front portion of the male component, at least one detent disposed at the inlet and having a substantially radial flank confronting the rear part of the female component and the chamber in the front part, and at least two windows which extend in the circumferential direction of the front part and communicate with the chamber behind the detent or detents. The connector further comprises a radially deformable resilient annular retaining member which is provided on the front portion of the male component and can undergo deformation during advancement through the inlet on its way into the chamber to thereupon expand and engage the flank when it is fully received in the chamber, and means for disengaging (when necessary) the retaining member from the flank(s) of the detent(s) to permit extraction of the front portion and retaining member from the front part of the female component by way of the inlet. The disengaging means comprises an annular deforming member which is provided in the chamber and has motion receiving portions (e.g., in the form of radially outwardly extending wings) extending into (and preferably outwardly beyond) the windows. The motion receiving portions are movable in their windows in the axial direction of the female component between retracted positions remote from and extended positions nearer to the inlet. The deforming member maintains the retaining member radially inwardly of the flank(s) in the extended positions of the motion receiving portions so that the front portion of the male component and the retaining member can be extracted from the front part of the female component.

The retaining member has a radially deformable section (preferably in the form of a hollow cone having a smooth external surface and flaring radially outwardly, i.e., away from the axis of the male component, in a direction away from the rear portion of the male component) which surrounds the male component and diverges in a direction toward the rear portion of the male component to abut the flank(s) in the retracted positions of the motion receiving portions. The deforming member permits the retaining member to assume a shape in which the external surface of the deformable section tapers toward the axis of the male component in a direction toward the rear portion of the male component when the retaining member is located in the chamber and the motion receiving portions of the deforming member are maintained in their retracted positions. At least one annular sealing element (e.g., an elastically deformable O-ring) can be carried by one of the components to establish a seal between the front portion of the male component and the front part of the female component when the retaining member engages the flank(s), i.e., in inserted position of the front portion of the male component. For example, the front portion of the male component can be provided with one or more external circumferential grooves each of which can receive an 0-ring serving to sealingly engage the internal surface of the front part of the female component when the retaining member bears against the flank(s) of the detent(s) of the front part of the female component.

The windows are or can be located substantially diametrically opposite each other with reference to the axis of the female component. The conical external surface of the retaining member is engaged by the annular internal surface of the deforming member during movement of the motion receiving portions toward their extended positions. If the internal surface of the deforming member is a circular surface, its diameter is smaller than the diameter of the maximum-diameter portion of the conical external surface of the retaining member to thus ensure that the maximum-diameter part of the retaining member is deformed radially inwardly toward the axis of the female component so that the retaining member can bypass the flank(s) of the detent(s) and permits extraction of the front portion of the male component from the front part of the female component when the motion receiving portions of the deforming member assume their extended positions.

The detent or detents preferably constitute inwardly extending protuberances on the internal surface of the front part of the female component. The hollow conical section of the retaining member can include substantially axially extending petals or like formations and recesses which alternate with the petals to enhance the deformability of the hollow conical section in response to movement of motion receiving portions of the deforming member to their extended positions while the front portion of the male component extends into the front part of the female component and the retaining member is located in the chamber of the front part. The maximum-diameter end of the hollow conical section (i.e., the tip of each petal) abuts the flank(s) of the detent(s) when the retaining member is received in the chamber. The recesses have open ends at the maximum-diameter end of the hollow conical section. The minimum inner diameter of the deforming member is smaller than the maximum diameter but larger than minimum diameter of the hollow conical section in undeformed condition of such section.

The width of the recesses which alternate with the petals of the hollow conical section of the retaining member can increase toward their open ends. Alternatively each open end can have a first width and each recesses includes a portion which is adjacent the respective open end and has a second width greater than the respective first width, i.e., the width of the recesses can increase, at least in part, in a direction away from the maximum-diameter end of the hollow conical section of the retaining member.

Each window can extend all the way to the front end face of the front part of the female component so that the windows divide the wall of the front part into a pair of axially parallel arms which are preferably located diametrically opposite each other and each of which preferably carries a discrete internal detent with a radially extending flank facing the rear part of the female component. The deforming member of such connector preferably comprises a substantially elliptical internal surface with a minor axis which is smaller than the maximum diameter of the hollow conical portion of the retaining member and a major axis. The arms are disposed at opposite sides of the major axis of such elliptical internal surface.

The deforming member can contain or can be made of slightly resilient plastic material, and the female component and the deforming member can be provided with cooperating means for preventing rotation of the deforming member relative to the female component, i.e., to prevent a change in the positions of the arms relative to the major and minor axes of the elliptical internal surface of the deforming member. Such rotation preventing means can comprise guide means provided on at least one of the arms and follower means provided on the deforming member to track the guide means. The follower means can include external sawtooth-shaped projections on the deforming member.

In accordance with a presently preferred embodiment, the retaining member comprises the aforementioned hollow conical section which flares outwardly from the male component in a direction toward the rear portion of the male component. The minimum-diameter (front) end of the hollow conical section is integral with a radially inwardly extending washer-like portion of the retaining member, and the radially innermost part of the washer-like portion is integral with a hollow conical portion which extends toward the rear portion of the male component and tapers toward the axis of the male component to abut an annular shoulder which is provided on the front portion of the male component and faces away from the rear portion The shoulder prevents the retaining member from moving relative to the male component in a direction toward the rear portion. Thus, when the front portion of the male component is properly received in the front part of the female component, the maximum-diameter end of the conical section of the retaining member abuts the flank(s) of the detent(s) and the conical portion of the retaining member abuts the shoulder of the male component to thus reliably hold the front portion against accidental extraction from the chamber in the front part of the female component.

The conical portion of the retaining member can be provided with axially parallel slots.

The retaining member can be made of spring steel, and at least one of the male and female components can be made of a suitable metallic material.

The novel features which are considered as characteristic of the invention are set forth in particular in the appended claims. The improved quick-release connector itself, however, both as to its construction and the mode of using the same, together with additional features and advantages thereof, will be best understood upon perusal of the following detailed description of certain presently preferred specific embodiments with reference to the accompanying drawing.

DESCRIPTION OF PREFERRED EMBODIMENTS

Figures 1, 2:
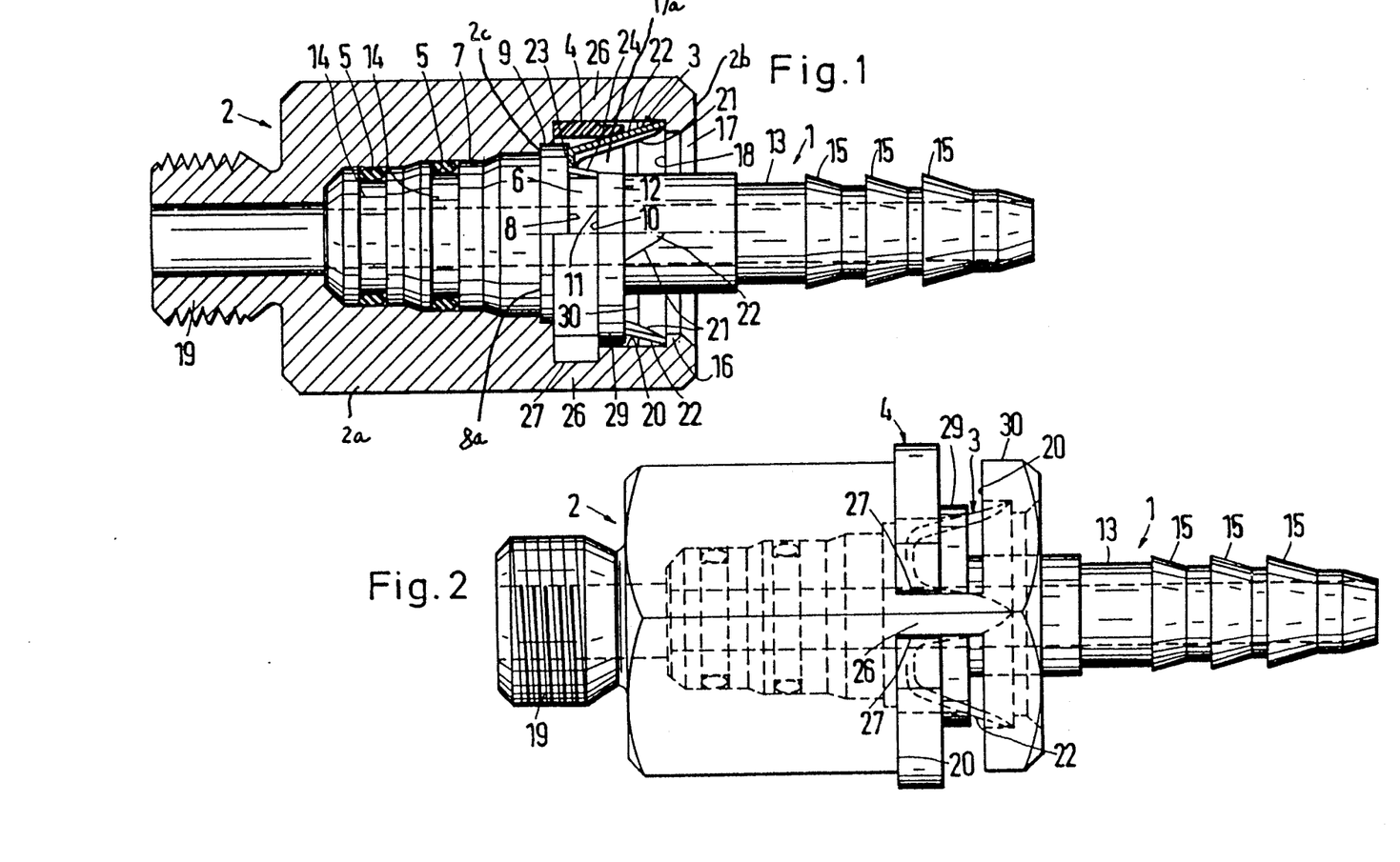
FIG. 1 is a partly elevational and partly axial sectional view of a fully assembled quick-release connector which embodies one form of the invention.
FIG. 2 is an elevational view of the connector with the male and female components turned through an angle of 90 degrees relative to the angular positions of FIG. 1.

The quick-release connector or coupling which is shown in FIGS. 1 and 2 comprises an elongated tubular male component 1, an elongated tubular female component 2, a ring-shaped retaining member 3 which surrounds a selected part of the front portion 7 of the male component, an annular deforming or disengaging member 4 which is axially movably installed in the front part 2a of the female component 2, and one or more ring-shaped sealing elements 5 (two shown in FIG. 1) which establish a seal between the exterior of the front portion 7 of the male component 1 and the adjacent internal surface of front part 2a of the female component 2. The components 1 and 2 are or can be made of a metallic material, the retaining member 3 is preferably made of spring steel, the disengaging or deforming member 4 is preferably made of a rigid plastic material, and the sealing elements 5 can be made of rubber or any other suitable elastomeric material which can undergo requisite deformation in response to proper (full) insertion of the front portion 7 of the male component 1 into the front part 2a of the female component 2.

The elongated tubular male component 1 includes several cylindrical and conical portions. The front portion 7 has an external circumferentially complete groove 6 surrounding a cylindrical surface and being disposed between a radial shoulder 8 confronting the rear portion 13 of the component 1 and a radial shoulder 10 facing away from the rear portion 13. The shoulder 8 constitutes one end face of a larger-diameter collar 9 forming an integral part of the front portion 7 and serving as an abutment for the retaining member 3.

The shoulder 10 is provided on a second collar 11 of the front portion 7 and can have a sawtooth-shaped profile (not specifically shown in the drawing). The collar 11 has a slightly conical peripheral surface 12 which tapers toward the axis of the male component 1 in a direction toward the rear portion 13 of the male component 1.

The front portion 7 is formed with several external circumferentially complete grooves 14 for portions of the sealing elements 5, and the rear portion 13 is provided with several circumferentially complete external ribs or barbs 15 which reduce the likelihood of accidental extraction of rear portion 13 from one end portion of a flexible hose (not shown) or another conduit which is to be coupled with a second conduit (not shown) by means of the improved quick-release connector. The end portion of the hose which surrounds the rear portion 13 of the male component 1 is preferably surrounded by a standard clamp or strap to ensure the establishment of a fluidtight seal between such end portion and the male component 1 as well as to further reduce the likelihood of unintentional extraction of the rear portion 13.

The female component 2 is an elongated tube which has a polygonal (hexagonal) external cross-sectional outline and includes the afore-mentioned front part 2a and an externally threaded rear part 19 which can be inserted into the end portion of the second conduit, e.g., into the internally threaded end of a nipple or pipe. If the external thread of the rear part 19 is replaced with ribs or barbs (such as the ribs or barbs 15 on the rear portion 13 of the male component 1), the rear portion 19 can be inserted into and clamped in one end portion of a hose or another flexible conductor.

The front part 2a of the female component 2 has a front end face 2b provided with a centrally located inlet 17 leading to an internal chamber 17a. The inlet 17 is adjacent an internal annular detent or rib 16 having a radial flank 18 facing toward the rear part 19 and serving as a stop for the maximum-diameter end of a hollow conical section (21+22) of the retaining member 3 when the latter is located in the chamber 17a. The inlet 17 is bounded by a conical internal surface of the front part 2a, and such conical surface tapers toward the axis of the female component 2 in a direction toward the rear part 19.

The peripheral wall of the front part 2a is formed with two circumferentially extending windows 20 which communicate with the chamber 17a behind the flank 18 of the detent 16 and accommodate motion receiving portions 4a (see also FIG. 5) of the deforming or disengaging member 4 (hereinafter called sleeve for short) with freedom of axial movement of the sleeve between the retracted position which is shown in FIGS. 1 and 2 and an extended or operative position in which the cylindrical internal surface 4b (FIG. 5) of the sleeve deforms the hollow conical section (21+22) of the retaining member 3 so that the member 3 and the front portion 7 of the male component 1 can be extracted from the front part 2a of the female component 2.

Figure 3:
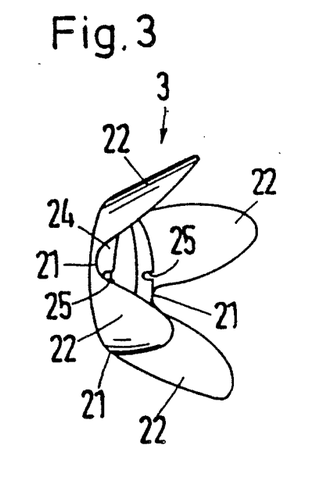
FIG. 3 is a perspective view of a retaining member which is used in the connector of FIGS. 1 and 2.
Figure 4:
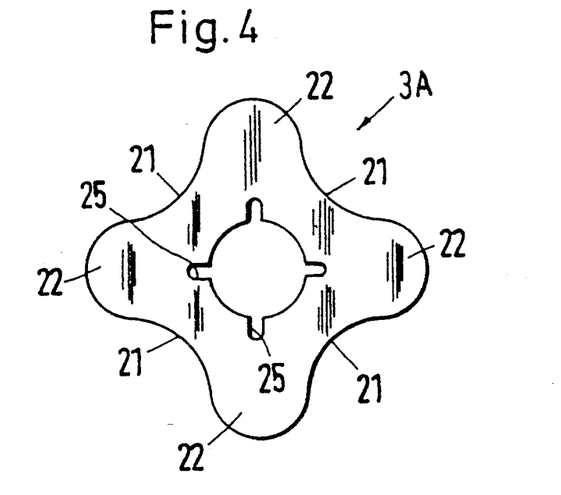
FIG. 4 is an elevational view of a metallic blank which can be converted into a retaining member of the type shown in FIG. 3.

FIG. 4 shows a blank 3A which can be converted into the retaining member 3 of FIG. 3. The illustrated member 3 has a hollow conical section which tapers toward the axis of the male component 1 in a direction away from the rear portion 13 and includes four petals 22 alternating with substantially axially parallel recesses or slots 21 each of which has an open end at the maximum-diameter (rear) end of the hollow conical section. The petals 22 are integral with the radially outermost part of a substantially washer-like portion 23, and the radially innermost part of the portion 23 is integral with the front end of a hollow conical portion 24 which tapers toward the axis of the male component 1 in a direction toward the maximum-diameter end of the hollow conical section including the petals 22 and recesses 21. The external surface of the hollow conical section (21+22) is a smooth conical frustum with a maximum-diameter end (at the tips of the petals 22) which abuts the radial flank 18 of the detent 16 when the member 3 is fully received in the chamber 17a and the sleeve 4 is maintained in the retracted or inoperative position of FIG. 1 or 2. The radially extending washer-like portion 23 of the retaining member 3 abuts the shoulder 8 of the collar 9, and the conical portion 24 is located in the groove 6 with its minimum-diameter end abutting the shoulder 10 of the collar 11. The conical portion 24 is formed with axially parallel slots 25 which permit deformation of this conical portion while the member 3 is being slipped over the rear portion 13 and conical surface 12 on its way toward abutment of its washer-like portion 23 with the shoulder 8; this enables the conical portion 24 to snap into the groove 6 and to enable the free end of the conical portion 24 to contract and move against the shoulder 10 to thus locate the member 3 in an optimum axial position relative to the male component 1.

The width of the recesses 21 in the hollow conical section of the retaining member 3 increases in a direction from the washer-like radially extending portion 23 toward the open ends of the recesses. The slots 25 in the conical portion 24 are optional, i.e., such slots are not needed if the material of the conical portion 24 is sufficiently elastic to permit expansion of the conical portion during advancement over the conical peripheral surface 12 of the collar 11 and toward and into the groove 6 between the shoulders 8 and 10. It is further within the purview of the invention to omit the collars 9, 11 and to dimension the portion 24 in such a way that it is a tight fit on the adjacent portion of the peripheral surface of front portion 7 of the male component 1. All that counts is to ensure that the illustrated retaining member 3 or an analogous retaining member can be reliably held in a selected axial position on the front portion 7 of the male component 1 so that the maximum-diameter end of the deformable hollow conical section (21+22) of the member 3 will abut the flank 18 when the member 3 is fully received in the chamber 17a and the sleeve 4 is maintained in the retracted position.

Figure 5:
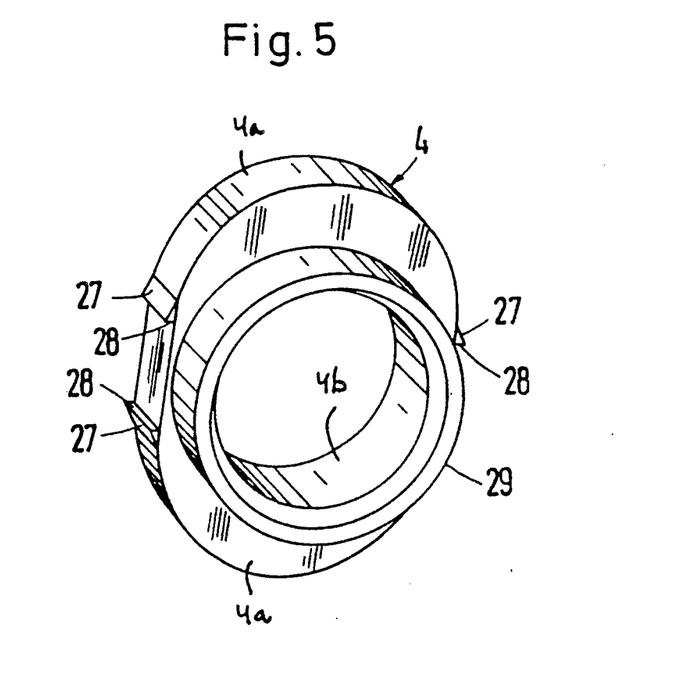
FIG. 5 is a perspective view of a disengaging or deforming member which is used in the quick-release connector of FIGS. 1 and 2 to deform the retaining member of FIG. 3.

The internal surface 4b of the sleeve 4 is a circular cylinder within a cylindrical portion 29 of the sleeve. The diameter of the surface 4b is larger than the minimum diameter but smaller than the maximum diameter of the hollow conical section (21+22) of the retaining member 3 when the latter is not deformed by the sleeve 4. The diameter of the internal surface 4b is slightly smaller than the inner diameter of the detent 16, and the external surface of the sleeve 4 has an elliptical outline. The major axis of the ellipse is located midway between the two arms or webs 26 between the windows 20. The minor axis of the ellipse halves the arms 26. The radially outermost (motion receiving) portions or handles 4a of the sleeve 4 are accessible outwardly adjacent as well as in the respective windows 20 and can be manipulated by hand to push or pull the sleeve between its retracted and extended positions.

In order to ensure that the angular position of the sleeve 4 with reference to the female component 2 does not change in inserted or extracted position of the front portion 7 of the male component 1, the sleeve 4 and the front part 2a of the female component 2 are provided with cooperating rotation preventing elements including paits of sawtooth-shaped external followers or projections 27 on the sleeve and guide means at the internal surfaces of the arms 26 between the windows 20. The flanks 28 of the projections 27 can slide along the guide means of the respective arms 26 in the axial direction of the female component 2. The flanks 28 further cooperate with the guide means of the arms 26 to properly center the internal surface 4b relative to the retaining member 3 on the front portion 7 of the male component 1. Such centering is desirable and advantageous when the retaining member 3 is fully received in the chamber 17a and the person in charge desires to deform the hollow conical section (21+22) of the member 3 preparatory to extraction of front portion 7 from the front part 2a. The sleeve 4 is capable of undergoing that (rather minor) deformation which is necessary to move the two front projections 27 radially inwardly during introduction of the sleeve into the front part 2a. This involves insertion of one of the motion receiving portions 4a into one of the windows 20 and pushing the sleeve 4 toward and into the other window 20 whereby the two front projections 27 ride over the internal guide means of the arms 26 until each of the two guide means enters the space between the flanks 28 of the respective pair of projections 27. This ensures that the internal surface 4b is in an optimum position to deform the hollow conical section of the retaining member 3 in response to movement of the sleeve 4 from the retracted position of FIGS. 1 and 2 toward the extended position in which the maximum-diameter end of the hollow conical section is located radially inwardly of the flank 18. The cylindrical portion 29 of the sleeve 4 extends toward the front end face 2b of the front portion 2a and, with a certain radial play, into a ring-shaped portion 30 of the front part 2a. The portion 30 connects the two arms 26 which extend between the windows 20 and are provided with the aforediscussed internal guide means for the external projections 27 of the sleeve 4.

In order to couple the components 1 and 2 with each other, the front part 7 of the male component 1 (such front part carries the retaining member 3 which is located between the shoulders 8 and 10) is simply introduced into the inlet 17 and is pushed toward, into and partly beyond the chamber 17a. The sealing elements 5 in the grooves 14 are deformed as a result of engagement with the internal surface of the front part 2a, and the forward movement of the component 1 into the component 2 is terminated when the retaining member 3 is fully received in the chamber 17a so that its hollow conical section (21+22) is free to expand radially whereby its maximum-diameter end engages the radial flank 18 of the internal detent 16. The latter deforms the hollow conical section of the retaining member 3 during introduction of this member into the chamber 17a via inlet 17. The resiliency of the petals 22 is sufficiently pronounced to ensure that the free ends or tips of such petals move radially outwardly and against the flank 18 as soon as they have advanced beyond the detent 16. At such time, the left-hand shoulder 8a of the collar 9 comes into abutment with an internal shoulder 2c of the front part 2a to prevent further penetration of the front portion 7 into the female component 2. Thus, the male component 1 is then held in an optimum axial position because the shoulder 8a abuts the shoulder 2c and the tips of the radially expanded petals 22 abut the flank 18 of the detent 16. The deformation of sealing elements 5 (when the shoulder 8a abuts the shoulder 2c) is sufficiently pronounced to prevent leakage of a medium which flows from the interior of rear portion 13 of the male component 1 toward the interior of rear part 19 of the female component 2 or in the opposite direction.

If the rear part 19 of the female component 2 is threadedly connected to a fixedly mounted housing, nipple or pipe (not shown) so that the female component 2 is reliably held against axial movement in either direction, disengagement of the male component 1 from the front part 2a of the female component 2 merely involves a pushing or pulling of the sleeve 4 from the retracted position of FIG. 1 or 2 toward the extended position in which the front side of the sleeve abuts the portion 30 and the detent 16 of the front part 2a. This causes the internal surface 4b of the sleeve 4 to move along the smooth external surface of the hollow conical section (21+22) of the retaining member 3 so that the tips of the petals 22 move radially inwardly beyond the flank 18 of the detent 16, i.e., the maximum-diameter end of the hollow conical section of the member 3 has a temporarily reduced diameter which is less than the inner diameter of the detent 16. The sleeve 4 is then maintained in the extended position of abutment with the portion 30 and detent 16 while the person in charge exerts a pull upon the end portion of the hose which surrounds the rear portion 13 of the male component 1 so that the front portion 7 and the sealing elements 5 are extracted from the front part 2a.

If the rear part 19 of the female component 2 is not connected to a fixedly mounted part, e.g., if the rear part 19 is connected with one end portion of a flexible hose, the female component 2 must be held with one hand while the other hand moves the portions 4a of the sleeve 4 relative to the front part 2a toward abutment with the portion 30 and detent 16. The sleeve 4 is then held in extended position by one or two fingers of the one hand while the other hand extracts the male component 1, the retaining member 3 and the sealing elements 5 from the front part 2a of the female component. Alternatively, one hand can grasp the end portion of the hose around the rear portion 13 of the male component 1 while the thumb and the index finger of the other hand engage and push the motion receiving portions 4a of the sleeve 4 in order to move the latter to the extended position. The other three fingers of the other hand are used to thereupon move the front part 2a of the female component 2 to the left, as seen in FIG. 1 or 2, in order to separate the components 1 and 2 from each other.

The resiliency of the retaining member 3 is or can be sufficiently pronounced to ensure that the petals 22 can return the sleeve 4 to the retracted position of FIGS. 1 and 2 if the motion receiving portions 4a are released by the hand of the operator as soon as the tips of the petals are located within the detent 16. As a rule, the sleeve 4 will be maintained in the extended position (of abutment with the detent 16) at least during the initial stage of extraction of the front portion 7 from the front part 2a. This ensures that the petals 22 cannot expand before their tips enter the space within the detent 16.

The diameter of the internal surface 4b of the sleeve 4 is selected in such a way that this surface can reduce the diameter of the maximum-diameter end of the conical section (21+22) of the retaining member 3 to less than the radius of the internal surface of the detent 16, i.e., to such an extent that the retaining member 3 cannot interfere with extraction of the front portion 7 of the male component 1 from the front part 2a of the female component 2. In other words, the extent of deformability of the maximum-diameter end of the conical section of the retaining member 3 should at least equal but preferably slightly exceeds the width of the radial flank 18 as measured in the radial direction of the female component 2.

It will be noted that the maximum-diameter end of the hollow conical section of the retaining member 3 is more distant from the front end of the male component 1 than the minimum-diameter end of this section. In other words, the hollow conical section including the petals 22 flares outwardly in a direction toward the rear portion 13 of the male component 1.

An important advantage of the improved connector is that it can be manipulated in a simple and convenient manner. Thus, and as already mentioned above, the exposed portion of the male component 1 (or the end portion of the conduit which surrounds the rear portion 13) is grasped by one hand while two fingers of the other hand push the sleeve 4 to its extended position whereupon the remaining fingers of the other hand pull the front part 2 away from the rear portion 13 while the two fingers of the other hand continue to maintain the sleeve 4 in the extended position. Retention of the sleeve 4 in the extended position preparatory to and at least during the initial stage of extraction of the front portion 7 from the front part 2 is necessary in order to ensure that the radially inwardly deformed maximum-diameter end of the hollow conical section of the retaining member 3 can bypass (i.e., pass through) the flank 18 of the detent 16 on its way toward and through the inlet 17. The retaining member 3 need not be provided with specially designed claws, projections and like parts because the radially expanded petals 22 can directly engage the flank 18 to reliably retain the member 3 in abutment with the detent 16 as long as the sleeve 4 remains in the retracted position of FIGS. 1 and 2. The absence of any specially configurated claws or like parts on the petals 22 contributes to simplicity and lower cost of the retaining member 3 without affecting its ability to reliably maintain the front portion 7 of the male component 1 in inserted position.

The number of windows 20 and arms 26 can be increased to three or more without departing from the spirit of the invention. The provision of two windows 20 which are located diametrically opposite each other is preferred at this time because such positioning of the windows renders it possible to insert the sleeve 4 into the front part 2 of the female component 2 in a simple and time-saving manner. Insertion is completed when the guide means of each of the arms 26 is disposed between the flanks 28 of two projections 27 on the respective half of the sleeve 4.

Another important advantage of the improved connector is that it is not necessary to provide the petals 22 with outwardly extending arms or analogous extensions which must be individually pressed toward or away from the axis of the female component 1 in order to disengage the retaining member 3 from the detent 16 in the female component 2. Reference may be had to the aforediscussed U.S. Pat. Nos. 4,541,658 and 4,601,497 to Bartholomew wherein each of several discrete retaining members must be individually pivoted or otherwise moved in order to permit extraction of the male component from the female component of the patented quick connector assembly. Simultaneous retention of several discrete retaining members in inoperative positions can cause many problems and can cause delays in disengagement of the male and female components from one another. The connector of the present invention is designed in such a way that the simple step of moving the sleeve 4 from the retracted to the extended position suffices to ensure that all petals 22 of the retaining member 3 are reliably deformed to an extent which is necessary to guarantee that the deformed petals can pass within the detent 16 on their way toward and beyond the inlet 17 of the front part 2a of the female component 2.

Since the width of the recesses 21 between the petals 22 decreases in a direction toward the maximum-diameter end of the hollow conical section of the retaining member 3, the width of the petals decreases in the same direction, i.e., the resistance of petals 22 to buckling or bending decreases in a direction from the radially extending washer-like portion 23 toward the maximum-diameter end of the hollow conical section of the member 3. Such design of the petals 22 is advantageous if the maker of the connector desires to reduce the force which is necessary to deform the petals 22 by the sleeve 4 or by the detent 16, i.e., preparatory to extraction of the front portion 7 or during insertion of the front portion 7 into the female component 2.

Figures 6, 7:
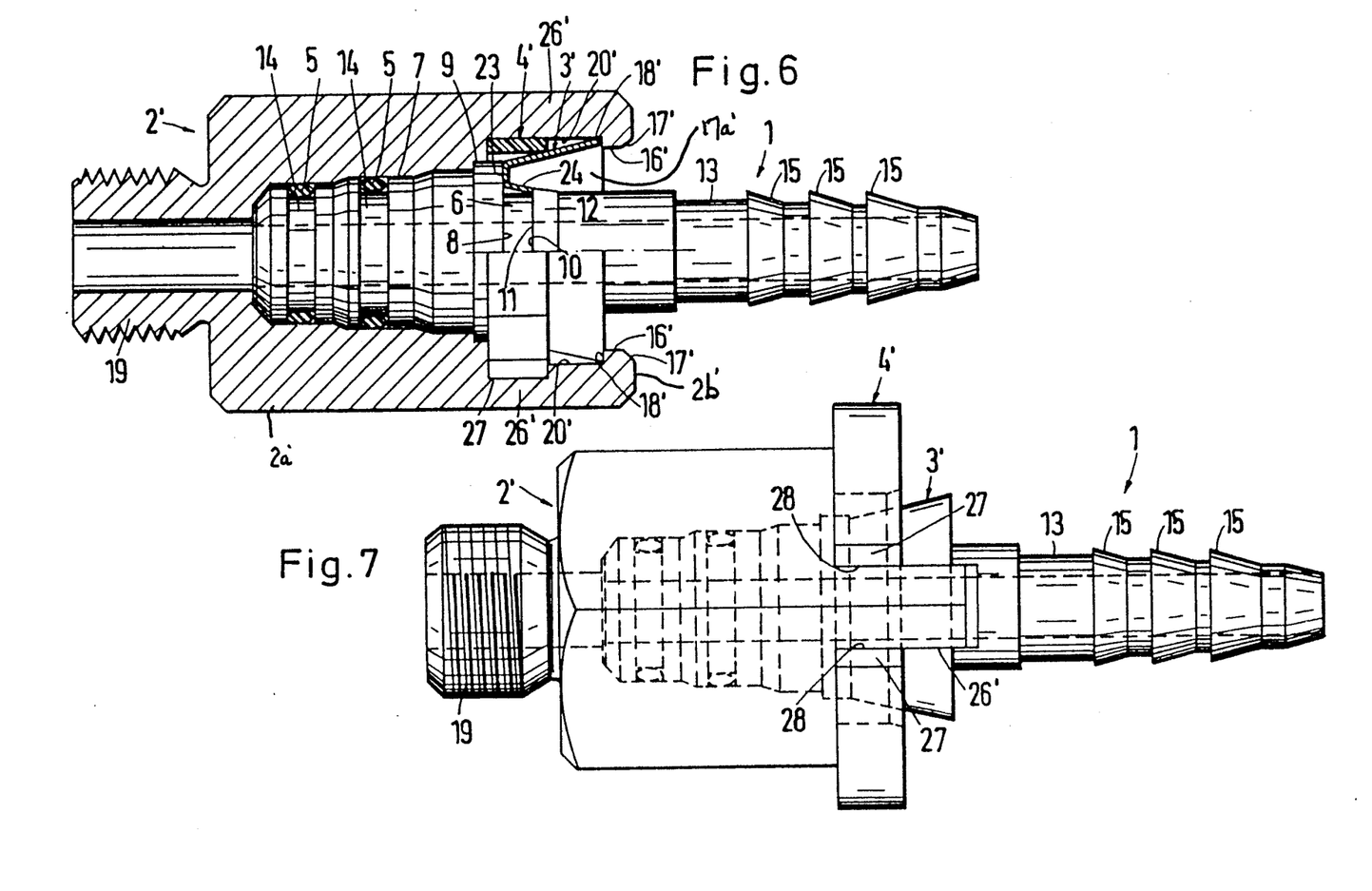
FIG. 6 is a partly elevational and partly axial sectional view of a fully assembled quick-release connector which embodies another form of the invention.
FIG. 7 is an elevational view of the modified quick-release connector with the male and female components turned through an angle of 90 degrees relative to the angular positions of FIG. 6.

FIGS. 6 and 7 illustrate a modified quick-release connector with a different female coupling component 2', a different retaining member 3' and a different sleeve 4'. The male component 1 in the connector of FIGS. 6 and 7 is or can be identical with the male component of FIGS. 1 and 2. The windows 20' of the front part 2a' extend all the way to the front end face 2b' so that the corresponding portion of the front part 2a' is divided into two discrete arms 26' which alternate with the windows 20'. The internal surfaces of the free front ends of the arms 26' are provided with axially parallel guide means for the projections 27 at the exterior of the sleeve 4'. The arms 26' are disposed diametrically opposite each other with reference to the axis of the female component 2'. Each arm 26' is provided with a discrete internal detent 16' which is adjacent the inlet 17' to the chamber 17a' and has a radial flank 18' facing toward the rear part 19 of the female component 2'. The inlet 17' is bounded by two arcuate conical surfaces on the respective detents 16'; these conical surfaces cause partial radially inward deformation of the retaining member 3' during introduction of this retaining member into the chamber 17a' of the front part 2a'. In all other respects, the female component 2' is or can be identical with the female component 2 of FIGS. 1 and 2.

The retaining member 3' (FIG. 10) has a circumferentially complete hollow conical section 3a' which replaces the petals 22 of FIG. 3. The radially extending washer-like portion 23 and the slotted conical portion 24 of the retaining member 3' are or can be identical with the similarly referenced portions of the retaining member 3.

Figure 11:
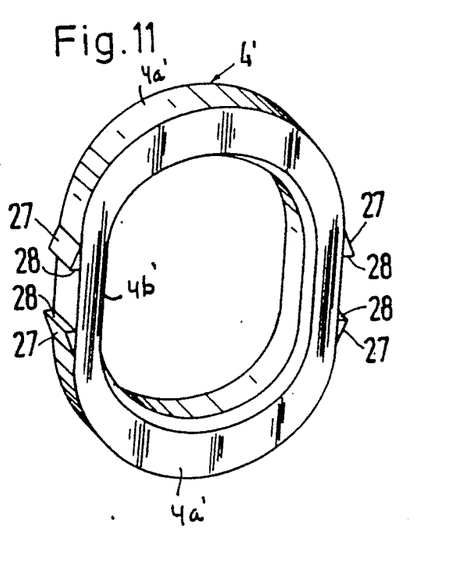
FIG. 11 is a perspective view of the disengaging or deforming member which is used in the connector of FIGS. 6 and 7.

The details of the sleeve 4' for use in the connector of FIGS. 6 and 7 are shown in FIG. 11. This sleeve has two motion receiving portions 4a' and an elliptical internal surface 4b'. The minor axis of the ellipsis halves the arms 26' of the front part 2a' and the major axis of the ellipse is disposed midway between these arms, i.e., the arms 26' are disposed at opposite sides of the major axis. The sleeve 4' does not include a portion corresponding to the cylindrical portion 29 of the sleeve 4 which is shown in FIG. 5.

Figure 9:
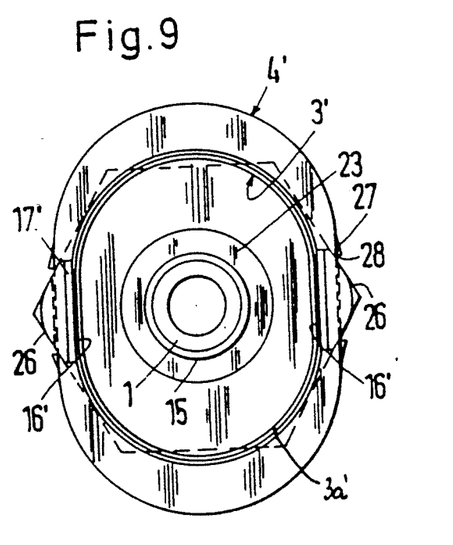
FIG. 9 is a similar end elevational view but showing the deforming member of FIG. 8 in the extended position in which the male component can be extracted from the female component of the modified quick-release connector.
Figure 10:
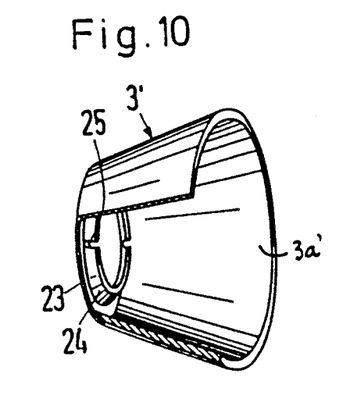
FIG. 10 is a perspective view of the retaining member which is used in the connector of FIGS. 6 and 7, a portion of the hollow conical section of the retaining member being broken away.

FIGS. 6 and 7 show the connector including the components 1 and 2' in assembled condition. Thus, the sealing elements 5 in the grooves 14 of the front portion 7 of the male component 1 are deformed by and sealingly engage the internal surface of the front part 2a' of the female component 2', the retaining member 3' is fully received in the chamber 17a' and the larger-diameter end of its hollow conical section 3a' abuts the flanks 18' of the detents 16' at the free ends of the arms 26'. The sleeve 4' is shown in retracted position in which it permits the conical section 3a' to abut the flanks 18'. During insertion of the retaining member 3' into the chamber 17a', the detents 16' deform the adjacent portions of the conical section 3a' so that the latter assumes a substantially oval or elliptical shape. Such deformation is temporary because the retaining member 3' exhibits a pronounced tendency to assume the shape which is shown in FIG. 10, i.e., the radially outermost part of the section 3a' reassumes a circular shape as soon as it advances beyond the detents 16' so that it can abut the flanks 18' and prevents accidental extraction of the front portion 7 from the front part 2a'. The manner in which the conical section 3a' of the retaining member 3' is deformed to assume an oval shape during advancement between the detents 16' and into the chamber 17a' is shown in FIG. 9.

Figure 8:
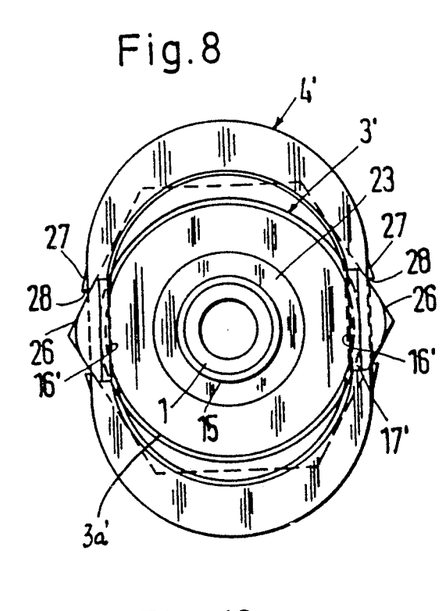
FIG. 8 is an end elevational view of the modified connector as seen from the right-hand side of FIG. 1, with the deforming member in retracted position.

In order to extract the front portion 7 and the retaining member 3' from the chamber 17a', the person in charge exerts a push or pull upon the motion receiving portions 4a' of the sleeve 4' in order to move the latter to the extended position (of abutment with the detents 16'). This results in deformation of the conical section 3a', i.e., the conical section 3a' assumes an elliptical or oval shape with a minor axis which is smaller than the minimum distance of the two detents 16' from each other. This enables the person in charge to extract the thus deformed retaining member 3' and the front portion 7 of the male component 1 from the front part 2a' of the female component 2'. FIG. 8 shows that the maximum-diameter end of the hollow conical section 3a' of the retaining member 3' automatically assumes a circular shape as soon as the inserting step is completed, i.e., as soon as the entire retaining member has advanced beyond the flanks 18' of the detents 16' and is thus confined in the chamber 17a'. The same holds true when the extracting step is completed, i.e., when the retaining member 3' is located to the right of the front end face 2b' of the front part 2a' as seen in FIG. 6 or 7.

The sleeves 4 and 4' are relatively simple and inexpensive. Moreover, each of these sleeves can be installed in the respective female component 2, 2' in a simple and time-saving manner. The deformability of the two elongated parallel portions of these sleeves (namely of the portions which are provided with the external projections 27) is sufficient to ensure that they can be slipped through one of the windows 20 or 20' and thereupon across the chamber 17a or 17a' and into the other window to an extent which is necessary to ensure that the internal surface 4b or 4b' is properly centered in the front part 2a or 2a'. The projections 27 perform the dual function of properly centering the respective sleeve in the front part of the female component as well as of cooperating with the guide means of the arms 26 or 26' to ensure that the sleeve is moved along a predetermined path on its way between the extended and retracted positions.

The slots 25 in the conical portion 24 of the retaining member 3 or 3' can be omitted if the material of the retaining member is sufficiently elastic to avoid damage to the conical portion 24 during movement along the rear portion 13 and toward the shoulder 8 of the collar 9.

The retaining member is preferably made of spring steel. This ensures that the retaining member can stand pronounced axial and/or other stresses at normal temperatures as well as at elevated or low temperatures. In other words, such retaining member can stand pronounced compressive stresses which develop when the male and female components are pulled apart while the sleeve 4 or 4' dwells in the retracted position. A prefabricated blank can be converted into a finished retaining member by deep drawing or by resorting to any other suitable technique. Moreover, a blank which is made of sheet steel can be relatively thin because the aforediscussed configuration enhances the stability of the retaining member, particularly in a direction from its maximum-diameter end toward the portions 23 and 24.

The male and female components can be made of a suitable metallic material which is capable of withstanding the anticipated thermal and mechanical stresses when the connector is in use.

An advantage of grooves 14 in the front portion 7 of the male component 1 is that the sealing elements 5 which are inserted into such grooves are properly located during insertion of the front portion 7 into the front part 2a or 2a' of the female component 2 or 2' as well as when the two components are fully assembled and during extraction of the male component from the female component. It has been found that the placing of sealing elements into external grooves of the front portion 7 of the male component 1 is much simpler and less expensive than the mounting of sealing elements in the interior of the female component, a procedure which is being resorted to in connection with the making of numerous conventional connectors. Mounting of the sealing elements in the interior of the female component renders it necessary to resort to separately produced confining rings. Furthermore, by mounting the sealing elements 5 at the exterior of the front portion 7 of the male component 1, a person in charge can immediately ascertain the presence or absence as well as the condition of the sealing element or elements prior each insertion of the front portion 7 into the female component or after each extraction of the front portion 7 from the chamber 17a or 17a'. Thus, the operator can immediately ascertain whether or not one or more sealing elements require replacement, and such replacement is a simple and time-saving procedure.

Figure 12:
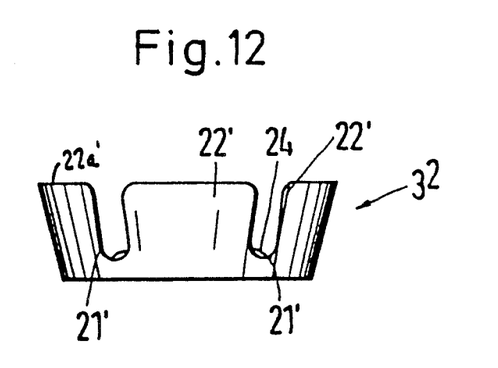
FIG. 12 is an elevational view of a third retaining member.

FIG. 12 shows a third retaining member $3^2$ which can be utilized in lieu of the retaining member 3 or 3'. The hollow conical section of the retaining member $3^2$ again comprises four petals 22' which alternate with substantially axially extending recesses 21'. The width of the recesses 22' increases gradually in a direction from the maximum diameter end of the hollow conical section toward the other end (i.e., toward the radially extending washer-like portion 23 which is not visible in FIG. 12). An advantage of the retaining member $3^2$ is that the flexibility of the petals 22' is more pronounced at the closed ends of the recesses 21'. Moreover, the petals 22' have long (as seen in the circumferential direction of the member $3^2$) edge faces 22a' which abut the adjacent flank 18 or flanks 18' when the member $3^2$ is fully received in the chamber 17a or 17a'. The relatively wide arcuate petals 22' (as seen in the circumferential direction of the member $3^2$) can stand (without the risk of buckling) more pronounced axial stresses than the narrower petals 21 which are shown in FIG. 3. The configuration of the washer-like portion 23 and of the conical portion 24 of the retaining member $3^2$ is or can be identical to that of the similarly referenced portions of the retaining member 3 or 3'.

Figure 13:
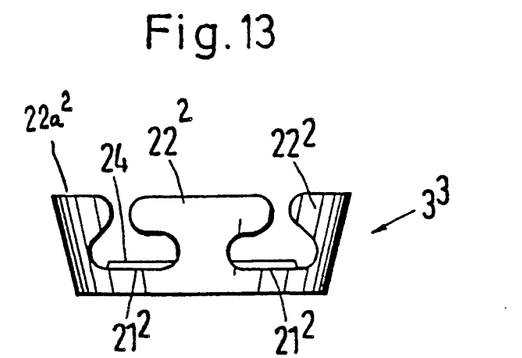
FIG. 13 is an elevational view of a further retaining member which constitutes a modification of the retaining member of FIG. 12.

FIG. 13 illustrates a fourth retaining member $3^3$ which constitutes a modification of the retaining member $3^2$. The width of the recesses $21^2$ between the petals $22^2$ first increases to thereupon decrease and to increase again in a direction from the smaller-diameter end toward the maximum-diameter end of the hollow conical section including the petals $22^2$. The recesses $22^2$ cause a pronounced reduction of rigidity and stability of median portions of the petals $22^2$; this renders it possible to insert the male component into the female component and to deform the petals $22^2$ by the sleeve 4 or 4' with the exertion of a relatively small force. At the same time, the petals $22^2$ have relatively long edge faces $22a^2$ which are in large-area contact with the flank 18 or with the flanks 18'. Thus, once the retaining member $3^3$ is fully received in the chamber 17a or 17a', its petals $22^2$ can offer a highly satisfactory resistance to extraction of the male component 1 from the female component 2 or 2' even if the person attempting to disengage the two components decides to apply a pronounced force. At the same time, the petals $22^2$ can be readily deformed radially inwardly in response to proper manipulation of the sleeve 4 or 4'.

An advantage of the retaining members which are shown in FIGS. 10, 12 and 13 is that they are maintained in large-area contact with the flank or flanks of one or more detents. The member 3' of FIG. 10 is deformed to assume an elliptical shape during passage between the detents 16'. The configuration of the retaining members of FIGS. 12 and 13 is such that the locations of maximum deformability are simply transferred from the region of the maximum-diameter end toward the washer-like portions 23. Moreover, the area of contact between the petals 22' or $22^2$ and the flank 18 or flanks 18' is larger than the area of contact between the flank 18 and the petals 22. Therefore, the arcs along which the free ends of the petals 22' and $22^2$ extend (in the circumferential direction of the female component 2 or 2') are longer than the arcs of the petals 22; this contributes to more satisfactory rigidity of the petals 22' and $22^2$, i.e., the resistance of petals 22' and $22^2$ to axial stresses is very pronounced.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A quick release connector for conduits, comprising a tubular male component including a rear portion connectable to a first conduit and a front portion; a tubular female component including a rear part connectable with a second conduit and a front part defining an internal chamber for said front portion, said front part having an axial inlet communicating with said chamber, at least one detent disposed at said inlet and having a substantially radial flank confronting said rear part, and at least two windows extending circumferentially of said front part and communicating with said chamber behind said detent; a resilient radially deformable annular retaining member provided on said front portion of said male component to undergo deformation during advancement through said inlet and into said chamber and to engage said flank when received in said chamber; and means for disengaging said retaining member from said flank to permit extraction of said front portion from said front part by way of said inlet, including an annular deforming member provided in said chamber said annular deforming member having radially outward portions extending into and movable relative to said windows longitudinally of said female component between a retracted position remote from said inlet and an extended position nearer to said inlet, said deforming member maintaining said retaining member radially inwardly of said flank in the extended position so that the front portion of said male component and said retaining member can be extracted from said front part.

2. The connector of claim 1, wherein said retaining member has a radially deformable section surrounding said male component and diverging in a direction toward said rear portion to abut said flank in the retracted position of said deforming member, said section of said retaining member having an external surface which tapers toward the axis of said male component in a direction away from said rear portion when said retaining member is located in said chamber and said deforming member is maintained in said retracted position.

3. The connector of claim 2, further comprising at least one annular sealing element carried by one of said components to establish a seal between said front portion and said front part when said retaining member engages said flank.

4. The connector of claim 1, wherein said windows are located substantially diametrically opposite each other, said retaining member having a substantially conical external surface which diverges toward said rear portion and said disengaging member having an annular internal surface with a diameter smaller than the maximum diameter of said external surface to deform said retaining member radially inwardly of the female component and beyond said flank in response to movement of said deforming member to said extended position.

5. The connector of claim 4, wherein said front part has an internal surface and said flank extends inwardly beyond the internal surface of said front part, said retaining member including a hollow section surrounding said male component and having a smooth conical external surface, said section including substantially axially extending petals and recesses alternating with said petals.

6. The connector of claim 5, wherein said section has a maximum-diameter end abutting said flank when said retaining member is received in said chamber, said recesses having open ends at said maximum-diameter end of said section.

7. The connector of claim 6, wherein said annular deforming member has an inner diameter which is smaller than the maximum diameter but greater than the minimum diameter of said section.

8. The connector of claim 6, wherein said recesses have a width which increases toward said open ends thereof.

9. The connector of claim 6, wherein each of said open ends has a first width and each of said recesses includes a portion adjacent the respective open end and having a second width greater than said first width.

10. The connector of claim 1, wherein said front part of said female component has an end face at said inlet and each of said windows extends from said front end face toward said rear portion, said front part having arms which alternate with said windows in the circumferential direction of said female component and each of said arms having an internal surface provided with a discrete detent for said retaining member, said retaining member having a conical external surface which tapers toward the axis of said male component in a direction away from said rear portion and said deforming member having a substantially elliptical internal surface with a major axis and a minor axis smaller than the maximum diameter of said conical external surface when said deforming member is maintained in said retracted position and said retaining member engages the flanks of said detents, said arms being disposed at opposite sides of said major axis.

11. The connector of claim 1, wherein said deforming member contains a slightly resilient plastic material, said female component and said deforming member comprising means for preventing rotation of said deforming member about said female component.

12. The connector of claim 11, wherein said rotation preventing means comprises guide means provided on said female component and follower means provided on said deforming member and tracking said guide means.

13. The connector of claim 12, wherein said follower means comprises external sawtooth-shaped projections on said deforming member.

14. The connector of claim 1, wherein said retaining member includes a substantially conical section which spacedly surrounds said male component and has a maximum-diameter end arranged to engage said flank and a minimum diameter end, said minimum-diameter end including a substantially washer-like portion extending radially inwardly toward said male component and a conical portion which tapers from the radially innermost part of said washer-like portion toward the axis of said male component in a direction toward said maximum-diameter end.

15. The connector of claim 14, wherein said male component has a substantially radial shoulder facing away from said rear portion and said conical portion of said retaining member abuts said shoulder to hold the retaining member against movement toward the rear portion of said male component.

16. The connector of claim 15, wherein said conical portion is provided with substantially axially parallel slots.

17. The connector of claim 1, wherein said retaining member consists of spring steel.

18. The connector of claim 1, wherein at least one of said components consists of a metallic material.

19. The connector of claim 1, wherein the front portion of said male component has at least one external circumferentially extending groove and further comprising a ring-shaped deformable sealing element in said groove.

* * * * *